US 11,797,315 B2

(12) United States Patent
Geimer et al.

(10) Patent No.: US 11,797,315 B2
(45) Date of Patent: Oct. 24, 2023

(54) AUTOMATIC ACQUISITION AND INTEGRATION OF SUPPLEMENTAL SOFTWARE PROGRAMS

(71) Applicant: MICROSOFT TECHNOLOGY LICENSING, LLC, Redmond, WA (US)

(72) Inventors: Matthew Steven Geimer, Everett, WA (US); Jiajun Hua, Bellevue, WA (US); Junyao Lai, Redmond, WA (US); Jose Julian Argil Torres, Sammamish, WA (US); Keyur Rahul Patel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 17/221,331

(22) Filed: Apr. 2, 2021

(65) Prior Publication Data

US 2022/0318031 A1    Oct. 6, 2022

(51) Int. Cl.
    *G06F 9/445* (2018.01)
(52) U.S. Cl.
    CPC .............. *G06F 9/44526* (2013.01)
(58) Field of Classification Search
    CPC .............. G06F 9/44526; G06F 8/61
    See application file for complete search history.

(56) References Cited

U.S. PATENT DOCUMENTS

| | | | |
|---|---|---|---|
| 2012/0173657 A1 | 7/2012 | Ozzie et al. | |
| 2018/0218006 A1* | 8/2018 | Palmer | G06F 16/178 |
| 2018/0349131 A1* | 12/2018 | Mitra | G06F 21/6218 |
| 2019/0312789 A1* | 10/2019 | Asbi | G06F 8/61 |

(Continued)

OTHER PUBLICATIONS

Google, "Use add-ons, Apps Script & AppSheet" (Mar. 3, 2021), p. 1 [retrieved from https://web.archive.org/web/20210303004422/https://support.google.com/docs/answer/2942256?hl=en&co=GENIE.Platform%3DDesktop] (Year: 2021).*

(Continued)

*Primary Examiner* — Brian W Wathen
(74) *Attorney, Agent, or Firm* — NovoTechIP International PLLC

(57) ABSTRACT

A method and system for automatically retrieving and integrating one or more supplemental software programs into at least one of an existing software program may include receiving a request to open a document via the existing software program, retrieving a list of supplemental software programs for the document, the list of supplemental software programs including an identification for each of the supplemental software programs and an application source from which the supplemental software programs can be retrieved, embedding the list of supplemental software programs into a data structure for the document, embedding a program for processing the list of supplemental software programs into a data structure for the document, and transmitting the data structure to a component for processing. The program is configured to retrieve the supplemental software programs from the application source and automatically integrate the supplemental software programs into the data structure.

18 Claims, 7 Drawing Sheets

(56) References Cited

U.S. PATENT DOCUMENTS

2020/0019414 A1* 1/2020 Byard ................ G06F 9/44526

OTHER PUBLICATIONS

"International Search Report and Written Opinion Issued in PCT Application No. PCT/US2022/020475", dated Jun. 9, 2022, 13 Pages.

"Customizing Office for the web using CheckFileInfo properties", Retrieved from: https://web.archive.org/web/20200924141217/https://wopi.readthedocs.io/en/latest/scenarios/customization.html, Sep. 24, 2020, 9 Pages.

"Microsoft 365", Retrieved from: https://www.microsoft.com/en-in/?ref=aka, Jan. 4, 2021, 3 Pages.

Brown, Daniel H., "Use policy settings to manage privacy controls for Office for the web applications", Retrieved from: https://docs.microsoft.com/en-us/deployoffice/privacy/office-web-privacy-controls, Mar. 2, 2021, 3 Pages.

Coulter, et al., "Automatically open a task pane with a document", Retrieved from: https://docs.microsoft.com/en-us/office/dev/add-ins/develop/automatically-open-a-task-pane-with-a-document, Jul. 7, 2020, 8 Pages.

Kirkham, et al., "Add-in commands for Excel, PowerPoint, and Word", Retrieved from: https://docs.microsoft.com/en-us/office/dev/add-ins/design/add-in-commands, Jan. 29, 2021, 7 Pages.

Scharlock, et al., "Extend custom functions with XLL user-defined functions", Retrieved from: https://docs.microsoft.com/en-us/office/dev/add-ins/excel/make-custom-functions-compatible-with-xll-udf, Aug. 13, 2020, 4 Pages.

Scharlock, et al., "Make your solutions available in Microsoft AppSource and within Office", Retrieved from: https://docs.microsoft.com/en-us/office/dev/store/submit-to-appsource-via-partner-center, Jan. 14, 2021, 5 Pages.

"CheckFileInfo", Retrieved from: https://web.archive.org/web/20200721224537/https://wopi.readthedocs.io/projects/wopirest/en/latest/files/CheckFileInfo.html, Jul. 21, 2020, 24 Pages.

* cited by examiner

AUTOMATIC ACQUISITION AND INTEGRATION OF SUPPLEMENTAL SOFTWARE PROGRAMS

TECHNICAL FIELD

This disclosure relates generally to automatic acquisition and integration of supplemental software programs, and, more particularly, to a method of and system for automatically acquiring a supplemental software program and integrating the supplemental software program into an existing software program to provide a seamless user experience.

BACKGROUND

A large number of supplemental software programs are available and offered for use with existing software programs to extend the capabilities of the existing software programs. For example, when added to and/or integrated with an existing software program, the supplemental software program may add to the features provided by the existing software program. These supplemental software programs often cannot be executed by themselves. Instead, they are designed to be used with particular existing software programs.

Use of such supplemental software programs often requires a separate installation from the existing software program. This may require the user to take specific actions such as identifying a source from which the supplemental software program is available for deployment, accessing the source and initiating the deployment process which may include several steps to install the supplemental program. This is a time-consuming and sometimes complex process. Moreover, in certain situations, such as when utilizing online applications accessed via third party organizations, the process may need to be repeated every time a different document is opened. Additionally, access to certain deployment sources may be blocked in some organizations, further limiting the user's ability to access and install a supplemental software program for enhancing the capabilities of an existing software program.

Hence, there is a need for systems and methods of automatically acquiring and integrating a supplemental software program with an existing software program.

SUMMARY

In one general aspect, described is a data processing system having a processor and a memory in communication with the processor wherein the memory stores executable instructions that, when executed by the processor, cause the data processing system to perform multiple functions. The functions may include receiving a request to open a document via an existing software program, retrieving a list of one or more supplemental software programs for the document, the list of one or more supplemental software programs including an identification for each of the one or more supplemental software programs and an application source from which each of the one or more supplemental software programs can be retrieved, embedding the list of one or more supplemental software programs into a data structure for the document, and embedding a program for processing the list of one or more supplemental software programs into a data structure for the document. The program is configured to retrieve the one or more supplemental software programs from the application source, and automatically integrate the one or more supplemental software programs into the data structure for the document.

In yet another general aspect, the instant disclosure describes a method for automatically retrieving and integrating one or more supplemental software programs into at least one of an existing software program. The method may include receiving a request to open a document via the existing software program, retrieving a list of one or more supplemental software programs for the document, the list of one or more supplemental software programs including an identification for each of the one or more supplemental software programs and an application source from which each of the one or more supplemental software programs can be retrieved, embedding the list of one or more supplemental software programs into a data structure for the document, and embedding a program for processing the list of one or more supplemental software programs into a data structure for the document.

In a further general aspect, the instant disclosure describes a non-transitory computer readable medium on which are stored instructions that when executed cause a programmable device to receive a request to open a document via an existing software program, retrieve a list of one or more supplemental software programs for the document, the list of one or more supplemental software programs including an identification for each of the one or more supplemental software programs and an application source from which each of the one or more supplemental software programs can be retrieved, embed the list of one or more supplemental software programs into a data structure for the document, and embed a program for processing the list of one or more supplemental software programs into a data structure for the document. The program is configured to retrieve the one or more supplemental software programs from the application source, and automatically integrate the one or more supplemental software programs into the data structure for the document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
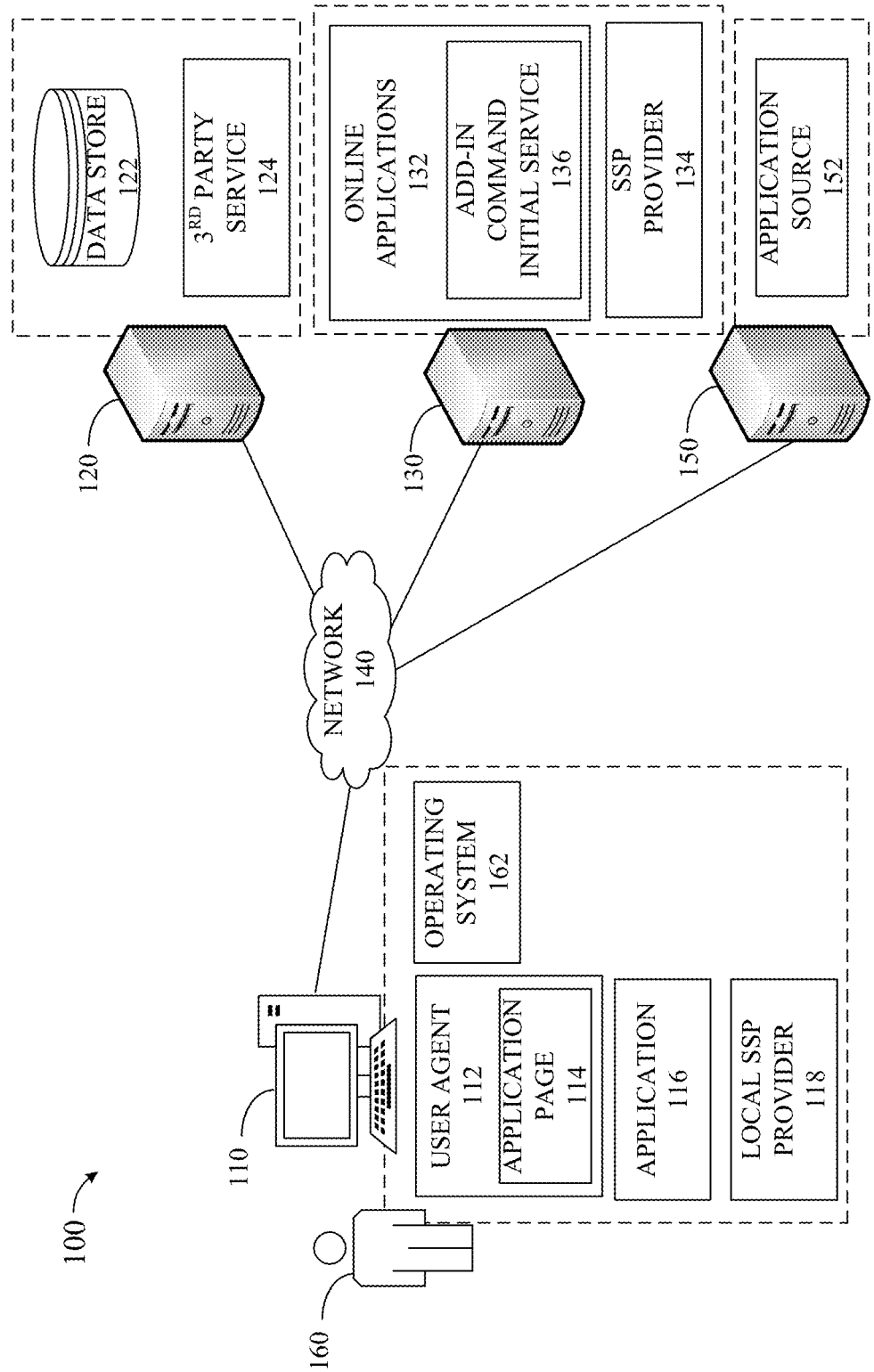
FIG. 1 depicts an example of an environment upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many users and enterprises make use of supplemental software programs to extend the capabilities of their existing software programs. The process of acquiring a supplemental software program, however, is often time-consuming, complex and sometimes restrictive. For example, certain restrictions may exist on use of an application source from which a supplemental software program may be acquired. However, a service that relies on a supplemental software program being present may not function properly without the supplemental program. For example, if a service requires a supplemental software program in order to operate properly, such as where a cloud storage provider provides access to documents stored in their cloud storage by connecting to their service via application programming interfaces (APIs) that are exposed to the user in the supplemental software program, without that supplemental software program, use of the service may not be possible. In such a case, if the user is not able to acquire the supplemental software program, the service may become unusable. As such, the service may need to ensure that the supplemental software program is acquirable to the user. This may not be possible without additional steps performed by the user or the user's organizational information technology (IT) department. For example, the user may need to access an application source and/or the IT department may need to change access restrictions to allow the user such access. These steps are often time-consuming and complicated, and may need to be repeated multiple times.

Furthermore, some services and/or programs may require or recommend the use of multiple supplemental software programs. These multiple supplemental software programs may be offered by different providers. For example, a service may require the use of one supplemental software program offered by a first provider. However, the same service may also be able to utilize another supplemental software program that results in a better user experience. This supplemental software program may be offered by a second provider. However, there are currently no mechanisms for curating, bundling and/or automatically acquiring multiple supplemental software programs across different providers and/or services. As a result, the process of acquiring a supplemental software program may need to be repeated multiple times to a make a service usable and/or enable the service to provide all desirable features. This is not only time-consuming, but it also leads to inefficient use of computing resources such as memory, processing, and bandwidth. As such, there exists a technical problem of not being able to offer use of and/or enhanced capabilities for services or existing software programs without specific user and/or administrator action.

To address these technical problems and more, in an example, this description provides a technical solution for automatic acquisition of one or more supplemental software programs and automatic integration of the acquired supplemental software programs with existing software programs. To do so, techniques may be used to receive a list of supplemental software programs required for a document during the process of establishing a session for the document. In an example, the list of supplemental software programs may be sent from a third-party storage server at which the document is stored to an application server (e.g., containing the application used for opening the document) with the request to establish a session for opening the document. The application server may embed the list of supplemental software programs in the data structure generated for creating the document. When the application used for accessing the document is an online application, the data structure may be sent along with a program specialized for processing the embedded list (e.g., a java script) to a user agent (e.g., a browser). The specialized program may examine the embedded list to identify an ID for each supplemental software program included in the list and determine a source from which the supplemental software program may be acquired. Upon identifying the source, a request for an address at which the supplemental software program can be access may be sent to the source. Once the address is received, the specialized program may acquire the supplemental software program and embed it in the data structure for the content, such that when the document is rendered, the supplemental software program is fully integrated in the document. In this manner, the process of requesting, acquiring and integrating supplemental software programs is simplified and automated. This significantly improves the process of acquiring supplemental software programs.

As will be understood by persons of skill in the art upon reading this disclosure, benefits and advantages provided by such implementations can include, but are not limited to, a technical solution to the technical problem of inefficient, complex and time and resource intensive process of acquiring and integrating supplemental software programs with existing software programs and services. The technical solutions may enable seamless acquisition and integration of supplemental software programs with web applications as well as local applications. Furthermore, the technical solutions may provide a mechanism for third party service providers (e.g., cloud storage providers) to offer access to and use of supplemental software programs directly from their services. The benefits provided by these technology-based solutions yield more user-friendly mechanisms for providing access to supplemental software programs and for enabling enterprises to efficiently and quickly provide one or more supplemental software programs with their services.

As used herein, the term "existing software program" may refer to a stand-alone software program which may function as a primary program and/or an existing service which can make use of a supplemental software program. The term "supplemental software program" or "add-in", on the other hand, may refer to a software program (e.g., a Microsoft® add-in) that cannot be executed by itself, but is executed instead from a stand-alone software program with which it functions. The supplemental software program may be a "core services" supplemental software program which is a software program required for running an existing software program or it may be an "enhanced capabilities" program which is a program that expands the capabilities of the existing software program. Furthermore, as used herein, the term "application source" may refer to any source from which a supplemental software program may be acquired and may include reference to application stores. Moreover, the term "document' may be used to refer to any electronic file.

FIG. 1 illustrates an example environment 100, upon which aspects of this disclosure may be implemented. Environment 100 may include a storage server 120 containing a data store 122. The data store 122 may function as a repository in which one or more documents are stored. In an example, the storage server 120 is a third-party cloud storage server provided for storing documents for a plurality of users and/or enterprises. The storage server 120 may be associated with or include a third-party service 124 for providing access to the documents stored in the storage server 120. In some implementations, the third-party service 124 includes one or more applications (e.g., cloud applications and/or online applications) that provide access to the documents stored in the storage server 120. The third-party service 124 may make use of the Web Application Open Platform Interface Protocol (WOPI) for accessing and/or editing documents. As such, the storage server 120 may operate as an online applications host and/or a WOPI server. The storage server 120 may also operate as a shared resource server accessible by various computer client devices such as client device 110. Furthermore, the server 120 may operate as a cloud-based server for storage services. It should be noted that although only one storage server 120 is shown, a plurality of storage servers may be utilized and/or available for use.

The client device 110 may be connected to the storage server 120 via the network 140. The network 140 may be a wired or wireless network(s) or a combination of wired and wireless networks that connect one or more elements of the environment 100. The client device 110 may be a personal or handheld computing device having or being connected to input/output elements that enable the user 160 to interact with content such as locally stored documents or documents stored in the storage server 120. Examples of suitable client devices 110 include, but are not limited to, personal computers, desktop computers, laptop computers, mobile telephones; smart phones; tablets; phablets; smart watches; wearable computers; gaming devices/computers; televisions; head-mounted display devices and the like. The internal hardware structure of a client device is discussed in greater detail in regard to FIGS. 6 and 7.

The client device 110 may access documents stored in the storage server 120 via the third-party service 124 and/or via one or more online applications 132. In some implementations, the third-party service 124 and/or online applications 132 may communicate with the client device 110 via a user agent 112, such as a browser, executing on the client device 110. The user agent 112 may provide a user interface (UI) that allows the user to interact with the third-party service, application content and/or documents stored in the data store 122 by for example displaying an application page 114. The UI may be displayed on a display device of the client device 110. In some examples, the user agent 112 may be a dedicated client application that provides a UI and access to documents stored in the data store 122. In other examples, applications used to create, edit, review and/or view digital content such as content of electronic documents may be local applications such as the applications 116 that are stored and executed on the client device 110, and provide a UI that allows the user to interact with application content and/or a third-party service. In some implementations, the applications 116 may include an application associated with or provided by the third-party service 124 for accessing documents stored in the storage server 120.

The client device 110 may include an operating system 162 and a local SSP provider 118. The operating system 162 may include one or more software programs executed on the client device 110 that process, manage, and enable operation of the user agent 112 and the applications 116. In an example, the operating system 162 may be a Microsoft Windows® operating system. Among other features, the operating system 162 may configure the client device 110 to be responsive to user input. User input may include input received via an input element such as a keyboard or a pointing device (e.g., a mouse) that enables the user 160 to interactively access different applications and application pages such as the application page 114. For example, the user may utilize a pointing device to move a pointer over an icon on the screen to invoke display of the application page 114 via which the user 160 may request access to a document stored in the storage server 120. The client device 110 may then communicate with the third-party service 124 to transmit a request for opening the document.

Once the third-party service 124 receives the request, it may identify the type of online application (or local application) required for opening the document. Furthermore, the third-party service 124 may identify a list of supplemental software programs required for opening, editing and/or utilizing the document. The list of supplemental software programs may be related to the type of document, type of application needed for opening the document and/or the user requesting the document. For example, the third-party service 124 may be aware that the user 160 utilizes a specific supplemental software program for the type of document being opened. The third-party service 124 may then transmit a request to the online applications server 130 for providing the resources for opening the document. The request may include a location identifier such as a uniform resource locator (URL) for the location at which the document is stored along with the list of supplemental software programs.

The online applications server 130 include and/or execute one or more online applications 132 and a supplemental software program (SSP) provider 134. The online applications server 130 may operate as a cloud-based server for offering global online applications 132 and/or SSP provider services. Although shown as one server, the server 130 may represent multiple servers for performing various different operations. For example, the server 130 may include multiple processing servers for performing the operations of multiple online applications 132 and/or the SSP provider 134.

The one or more online applications 132 may be applications provided by a service for allowing a user to interactively view, generate and/or edit documents on the web. Examples of suitable applications include, but are not limited to, a word processing application, a presentation application, a note taking application, a text editing application, an email application, a spreadsheet application, an instant messaging application, a communications application, a digital drawing application, and a collaboration application, among others. The SSP provider 134 may operate with the online applications 132 to enable automatic retrieval and integration of supplemental software programs into the online applications 132 used for opening the requested document.

Once the request for providing the resources for opening the document is received from the storage server 120, the online applications server 130 may utilize the location identifier for the document to retrieve the document content. The online applications 132 may then proceed to use the retrieved content to construct the data structure representing the document. In some implementations, the data structure constructed is in a format associated with the Hypertext Markup Language (HTML) that can be utilized by the user agent 112 (e.g., a browser). In constructing the data structure, the online applications 132 and/or the SSP provider 134 may ensure that the list of supplemental software programs is embedded within the data structure. Furthermore, to enable the user agent to process the list of supplemental software programs, the online applications 132 and/or the SSP provider 134 may include a program specialized for processing the embedded list (e.g., a JavaScript) along with the data structure. The online applications server 130 may then transmit the resulting data structure along with the online applications' UI page to the user agent 112 for processing.

The user agent 112 may load the received UI page in a framework (e.g., an iframe) created for the online application. While processing the received data structure, the user agent 112 may also load the program for processing the embedded list of supplemental software programs. Once loaded, the program may access the embedded list to locate an identification (ID) for each SSP included in the embedded list of supplemental software programs and identify a source from which each SSP may be retrieved. In some implementations, the source be may identifiable from the ID of the SSP. In some implementations, SSPs are identified by a combination of their SSP ID and a designation identifying the source from which they can be deployed. The combination of application ID and the designation identifying the source may be referred to as an asset ID.

The source for the SSP may be an application source such as the application source 152 stored in a source server 150. Once the source for an SSP in the embedded list is identified, the program may transmit a request to the source for receiving a manifest associated with the SSP. The manifest may be a file (e.g., an xml file) that contains the address locator (e.g., URL) from which the SSP can be retrieved. Once the manifest is received, the program may examine the content of the manifest to locate the address locater, and transmit a request for retrieving the SSP from the address identified. The SSP may then be retrieved and embedded in the content of the document before the document is rendered by the user agent 112, such that when displayed, the SSP is integrated into the displayed document.

In some implementations, the document opened is a local document and/or the application used to open the document may be a local application such as applications 116. In such instances, the applications 116 may operate with the local SSP provider 118 to automatically retrieve and integrate the required SSPs into the document once opened. In some implementations, the integration process may also include loading one or more user interface elements (e.g., icons representing the SSP) on user interface screens (e.g., on a ribbon, as a shortcut, and the like), and activating the SSP within the loaded document. As such, the user 160 may not be required to perform any additional actions for accessing, enabling and using one or more SSPs with a document.

The source server 150 may operate as a server containing one or more application sources such as application source 152 which may operate for deployment of various applications (e.g., supplemental software programs). In an example, the application source 152 may operate as an application store (e.g., third party application store, consumer application store or central deployment application store) for deploying various applications and supplemental software programs. In some implementations, the application source 152 provides access to a store catalog containing a list of applications available for installation from the application source 152. Deployment may include retrieval of executable code for installation and/or integration of an SSP with an existing software program.

In some implementations, a software component referred to as the add-in command initial service (ACIS) 136 is used for installing supplemental software programs. ACIS may be a part and operate from within the online application 132 and as such may run as part of the online application 130 in the user agent 112. That is because unlike rich client (e.g., Win 32, W/X/P) which often locally cache installed supplemental software programs, the online application 132 does not store installed supplemental software programs. Instead, when an online application provided by the online application server 130 launches, the online application 132 may call into the ACIS 136 to install the supplemental software programs. ACIS 136 may then go through all registered SSP providers to get a list of supplemental software programs and install them. To do so, ACIS 136 may utilize an add-in command. In some implementations, a third-party service such as the third-party service 124 registers itself to ACIS 136 as a provider. In this manner, supplemental software programs may be installed from the third-party service UI page once it is launched. Additionally or alternatively, supplemental software programs may be installed upon opening an existing document with a persisting SSP via a third-party service, clicking on a refresh menu option on a SSP UI menu, or selecting to insert a SSP from a SSP UI menu. In some implementations, to prevent abuse, before an SSP is installed, the third-party service may ensure that the SSP ID exists in a SSP list from the third-party UI page and/or the manifest for the SSP is available from the application source 152.

Figure 2:
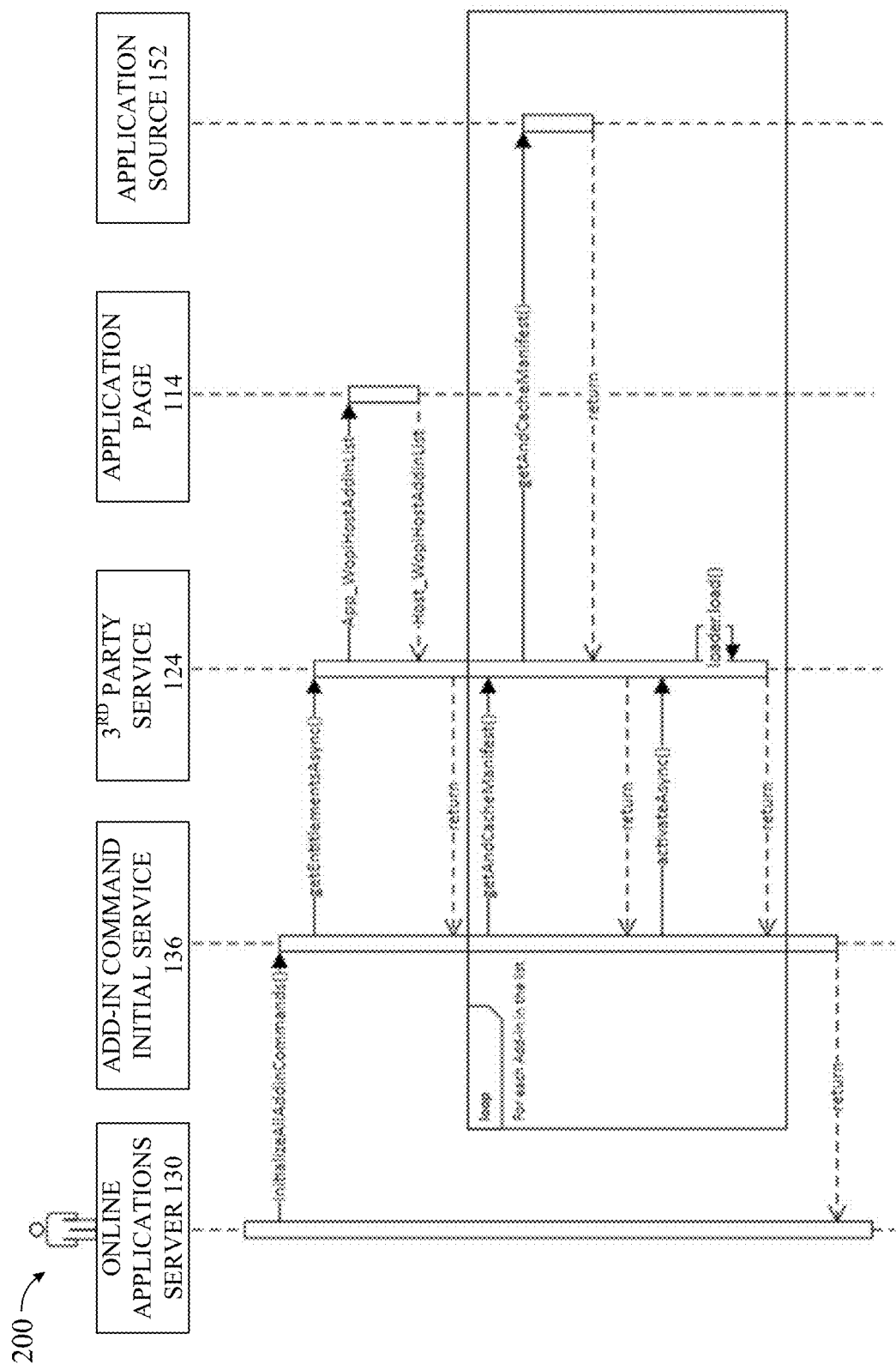
FIG. 2 is a sequencing diagram for automatic retrieval and integration of a supplemental software program into an existing software program.

FIG. 2 is a sequencing diagram 200 for automatic retrieval and integration of an SSP into an existing software program via an ACIS. The process may begin once a request to launch an online application is received by the online application server 130. In some implementations, upon receiving the request, the online application 132 may be launched, and an initial UI may be presented to the user, before the online application 132 calls the ACIS 136 via a command (e.g., initializedAllAddinCommands). In turn, the ACIS 136 may call the third-party service 124 to get a list of supplemental software programs via a call (e.g., getEntitlementsAsync). In response, the third-party service 124 may send a request to the application UI page 114 via a post message (e.g., App-WopiHostAddinList). The application UI page 114 may retrieve a list of supplemental software programs and send a message (e.g., Host_WopiHostAddinList) back to the third-party provider 124. In some implementations, the content of the message may include the list of supplemental software programs in JSON format. The third-party provider 124 may then return the list of supplemental software programs to the ACIS 136.

Once the list is received by the ACIS 136, for each SSP in the list, the ACIS 136 may call the third-party provider 124 to retrieve the manifest associated with the SSP. The third-party provider 124 may redirect the manifest request to the application source 152, which may return the requested manifest to the third-party provider 124. In response, the third-party provider 124 may return the manifest to the ACIS 136. In turn, the ACIS 136 may call an activateAsync function to the third-party provider 124 for installing the SSP. The third-party provider 124 may examine a prerequisite for installing the SSP, before calling a loader.load function to install the SSP. The result may be returned to the ACIS 136.

Figure 3:
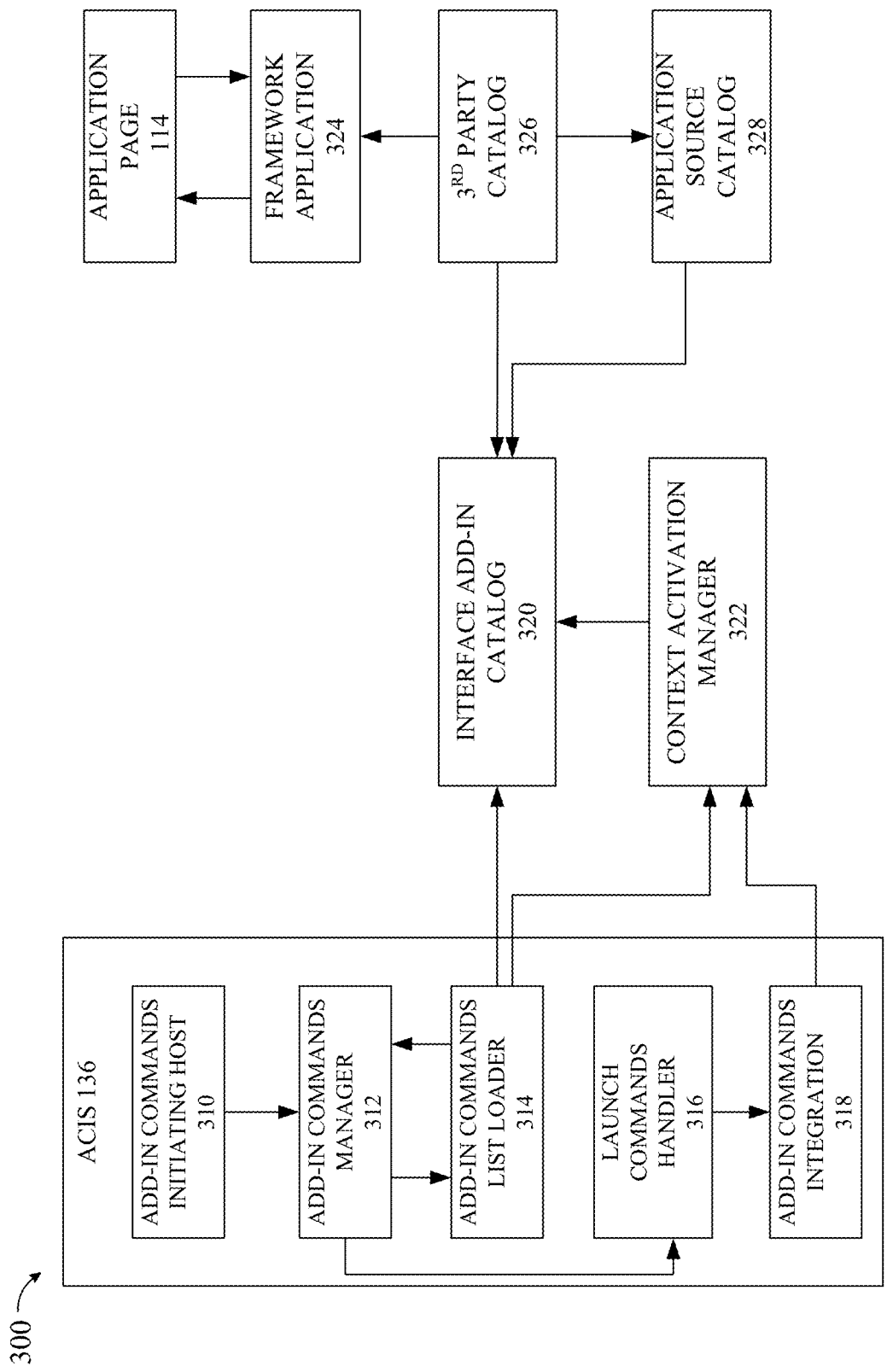
FIG. 3 is a diagram depicting software components used for integrating a supplemental software program into an existing software program.

FIG. 3 is a diagram 300 depicting different software components used for integrating an SSP into an existing software program. As depicted, ACIS 136 may include a variety of different software components such as an add-in commands initiating host 310, an add-in commands manager 312, an add-in commands list loader 314, a launch commands handler 316 and an add-in commands integration component 318. Each of the different components may themselves include a variety of functions and variables. For example, the add-in commands initiating host 310 may include a function for retrieving an add-in flag. In some implementations, this function is referred to as RetrieveAddinFlagCompleted. The add-in commands initiating host 310 may transmit a message to the add-in commands manager 312. In some implementations, this message is referred to as the CommonCommands.RetrieveAddinCommandEntitlementsList. The add-in commands manager 312 may include a function for retrieving the add-in commands entitlements list (e.g., RetrieveAddinCommandsEntitltementsList) and a function for launching the add-in commands (e.g., LaunchAddinCommands). The add-in commands manager 312 may transmit a request to the add-in commands list loader 314 for retrieving the commands entitlements list and may receive, in return, the retrieved entitlements list. To retrieve the entitlements list, the add-in commands list loader may include a plurality of functions including one for retrieving the entitlements list (e.g., TryRetrievAddinCommandsEntitlementsList), one for loading the add-in commands by entitlements (e.g., OnLoadAddinCommandsByEntitlements), and another one for providing an indication that loading the list is completed (e.g., OnAddinCommandsJudgementCompleted). For launching the add-in commands, the add-in commands manager 312 may send a request to the launch add-in commands handler 316 to launch add-in commands. The add-in commands handler 316 may call the launch add-in commands function for launching the add-in commands. This may include sending a request to the add-in commands integration component 318, which may call a function to a context activation manager 322 for inserting a control (e.g., Office Solution Framework). In turn, the context activation manager 322 may issue a function for getting and caching an add-in manifest to an interface add-in catalog 320.

The add-in commands list loader may also issue a function (e.g., GetEntitlementsAsync) to the interface add-in catalog 320 for obtaining the list of add-ins for each add-in provider. The interface add-in catalog 320 may function as an interface that communicates with an application source catalog 328 and a third-party catalog 326 to obtain the list of all available and/or required add-ins. In this manner, the interface add-in catalog 320 may help conceal the details of add-in providers (e.g., provider catalogs at code level). This can make the process of adding new types of providers to the online applications framework easier and more efficient. In response to the request for obtaining the list of add-ins, each provider may implement the function differently. For example, the application source catalog 328 may return a list of add-ins the user has installed before. A central deployment provider (not show) may return a list of add-ins selected by an enterprise administrator. The third-party provider may return a list of add-ins requested and/or provided by the third-party application page 114. To obtain the manifest for third-party provider add-ins, the third-party catalog 326 may call a function for getting and caching the manifests for those add-ins from the application source catalog 328. Thus, the third-party provider may rely on the application source to provide a required add-in manifest.

The third-party catalog 326 may also call a function for obtaining the third-party add-in list to the framework application 324 which may, in turn, transmit a request for obtaining the required third-party add-ins to the application page 114. In some implementations, the interface catalog 320 is implemented by a third-party service or provider by providing three functions (e.g., three APIs such as GetEntitlementAsync, GetAndCacheManifest, and ActivateAsync).

For each entitled add-in (e.g., an add-in the user has access to), the ACIS 136 may determine if the add-in is an add-in command. When the add-in is not an add-in command, it may be ignored. However, when the add-in is an add-in command, the ACIS 136 may indirectly call a get and cache manifest function, as discussed above, before calling an activate function (e.g., activateAsync) to install the add-in. In addition to installing the code for executing the add-in, the installation process may also include projecting one or more UI menu options (e.g., ribbon buttons) for each add-in. If an add-in contains custom functions, those functions may also get installed during the installation process. Thus, the mechanisms disclosed herein may make use of some existing online applications frameworks to automatically provide and integrate required add-ins. In some implementations, because there is no add-in command cache in the online application server, every time an online application is launched, all information required to provide add-in UI menu options is retrieved and integrated.

Figure 4:
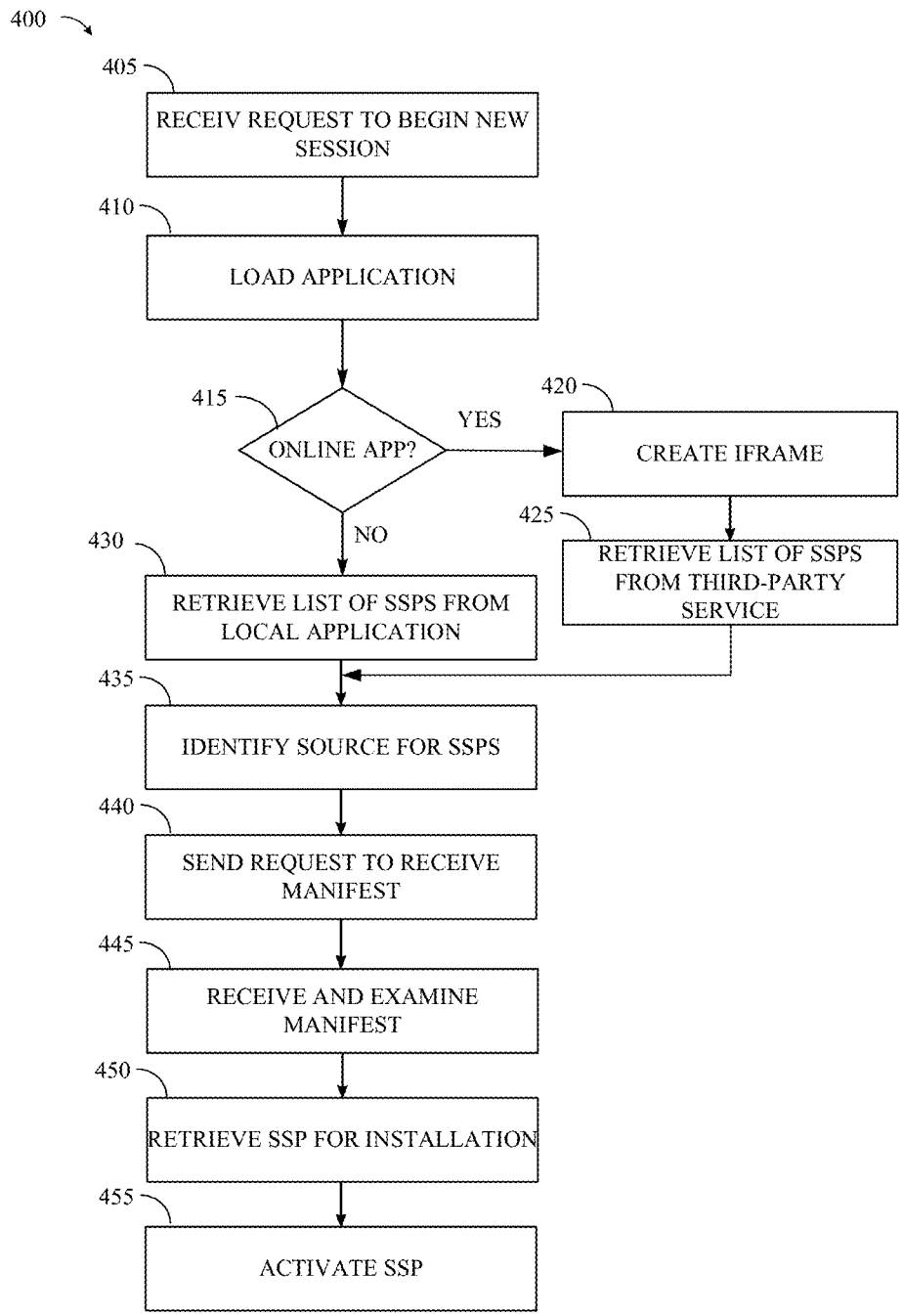
FIG. 4 is a flow diagram showing an example of a method for automatic retrieval and integration of supplemental software programs into an existing software program.

FIG. 4 is a flow diagram depicting an exemplary method 400 for automatic retrieval and integration of supplemental software programs into an existing software program. In an example, one or more steps of method 400 may be performed by a third-party service (e.g., third-party service 124 of FIG. 1), an applications server (e.g., applications server 130 of FIG. 1), an online application (e.g., online applications 132) and/or a user agent (e.g., user agent 112 of FIG. 1).

At 405, method 400 may begin by receiving a request to begin a new session. The request may be received from a user utilizing a client device. For example, the request may be received via a user agent (e.g., a browser) of the client device and may be directed to a third-party service (e.g., a third-party cloud storage service). In an example, the request relates to opening a document stored at a storage server. Alternatively, the request may be received via a locally stored application. For example, the request may be received for opening a locally or remotely stored document via a local application. In an example, this occurs when a document which requires the use of a supplemental software program (e.g., either for core service or for enhanced capabilities) is opened. In some implementations, one or more steps of method 400 may be performed upon refreshing of an SSP list (e.g., refreshing of add-in list) or selecting an SSP insertion menu option.

After the request for beginning a new session is received, method 400 may proceed to launch the application, at 410. When the request is received via a user agent, this process may involve loading the application page UI (e.g., WOPI UI page) in the user agent. For a local application, this may include launching the local application. Once the application page or local application has been loaded, method 400 may proceed to determine if the application is an online application or a local application, at 415. When the application is an online application, method 400 proceed to create an iFrame for the online applications service, at 420. In some implementations, this is performed by the application page and may include sending a Form Post request from the application page to the online applications server. Method 400 may then proceed to retrieve a list of SSPs from the third-party service (e.g., WOPI service), at 425. This may involve sending a request to the third-party service (e.g., WOPI host page) for receiving the document content and receiving the list of SSPs, in response to which the list of SSPs may be sent to the online applications server. Once the SSP list is received, it may be transmitted to the user agent for further processing. This may involve creating the data structure for the document content at the online applications server and embedding a program such as a JavaScript within the data structure for processing the SSP list.

When it is determined that the application used for opening the document is a local application (no at 415), method 400 may proceed to retrieve the list of SSPs from the local application, at 430. This may involve examining the document, application and/or user information to determine which supplemental software programs are needed for opening the document. Once the list of SSPs is retrieved (e.g., via the WOPI page or the local application), method 400 may proceed to identify the source from which each SSP can be retrieved, at 435. This may involve examining an ID for each SSP in the list and identifying a portion of the ID that provides information regarding the source for the SSP.

Once the source of each SSP is identified, method 400 may proceed to send a request for receiving the manifest associated with the SSP to the identified source, at 440. In response, method 400 may receive and examine the manifest, at 445. This may involve examining the manifest to find the location identifier (e.g., URL) from which the SSP may be retrieved. Once the location identifier has been identified, method 400 may proceed to retrieve the SSP from the identified location, at 450. This may involve, downloading the SSP from the identified source (e.g., application source server) and installing it on the client device and/or executing the SSP within the user agent (e.g., via the JavaScript). Once the SSP is installed, method 400 may proceed to activate the SSP, at 455. The activation process may involve enabling the SSP and/or projecting SSP UI menu options into the application page and/or the application loading the document to provide the functionalities of the SSP to the user. In some implementations, once an SSP has been retrieved and installed for a document, the SSP may persist for that document in the future. Thus, the next time the document is opened, the code for executing the SSP may already exist within the document data structure or at a location associated with and the document, such that the SSP may be enabled when the document opens.

Figure 5:
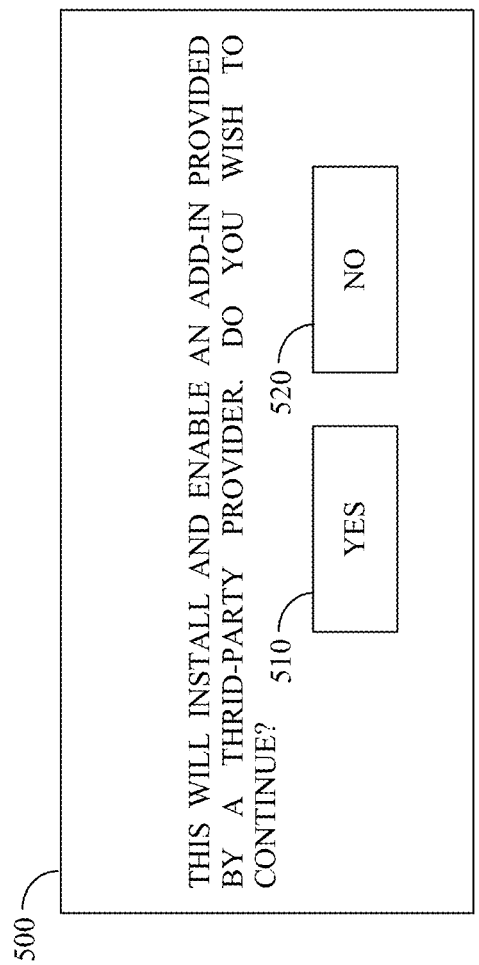
FIG. 5 is a user interface element displayed the first time a supplemental software program is launched and/or installed for a user or a document.

In some implementations, the process of installing and/or activating an SSP for a document may require user consent. For example, when an SSP is a new SSP or from a new provider, user and/or enterprise consent may be required. To address this requirement, a UI element (e.g., dialog box), such as UI element 500 of FIG. 5 may be displayed the first time an SSP is launched and/or installed for a user or a document (e.g., the first time a user launches an add-in from a WOPI provider). The UI element may provide information about the SSP to the user and require the user's permission for proceeding. For example, the UI element may inform the user that the SSP is a new SSP, may provide the source of the SSP (e.g., application store), and/or may provide an indication that the SSP is not associated with the third-party service provider or online applications service. Furthermore, the UI element may seek the user's permission or rejection for proceeding. When the user provides consent, by for example, selecting the yes UI element 510, the SSP may be retrieved and/or activated. When the user does not provide consent (e.g., selecting the UI element 520), however, the SSP may not be activated for the user.

In some implementations, further determinations may be made before presenting a consent UI element to the user. For example, an approved SSP list may be examined to determine if the new SSP is included in the approved SSP list. If the new SSP is in the approved list, the consent UI element may not be displayed. For example, the third-party service may provide a list of core service SSPs and indicate that these SSPs have been approved for use with the third-party services. In some implementations, the consent UI element may not be displayed for such SSPs, as the third-party service has already approved them and indicated that they are required SSPs. Alternatively or additionally, a third-party service provider may provide a list of enhanced service SSPs to the online applications service and indicate that the SSPs included in the provided list do not require consent when they are executed in a specific environment. This may require authorization from both the third-party service provider and the SSP source (e.g., application source). When such authorization is provided, the consent UI element may not need to be displayed to the user.

Mechanisms disclosed herein may be applied to provide an improved user experience in using one or more SSPs by automatically retrieving and integrating the SSPs with existing software programs and services with minimal user action. In some implementations, these mechanisms provide an improved method for application integration that allows third-party services to automatically enable additional capabilities via add-ins which function as service extensions or core services. In some implementations, the mechanisms include curation and bundling of SSPs (e.g., service extensions) across different third-parties, which significantly improves the user experience. For example, a service provider may be enabled to specify SSPs (add-ins) from an application store and the SSPs may be provided to the user upon opening a document. Minimal user action may be required to access and use the SSPs. In some implementations, the only user action required may be viewing and responding to a consent dialog when the document first opens. The mechanism disclosed herein may automatically acquire and insert the SSPs to the appropriate documents, with the SSPs being appropriate for their users for both core service access as well as enhanced capabilities. These services may be provided as an extension of the WOPI protocol to allow acquisition of SSPs requested by a third-party service. Thus, the architecture provided herein enables automatic retrieval of one or more SSPs when using third-party services and/or local applications. This provides an improved user experience by eliminating the need to access multiple SSP sources and/or performing multiple tasks to enable use of a plurality of SSPs.

Figure 6:
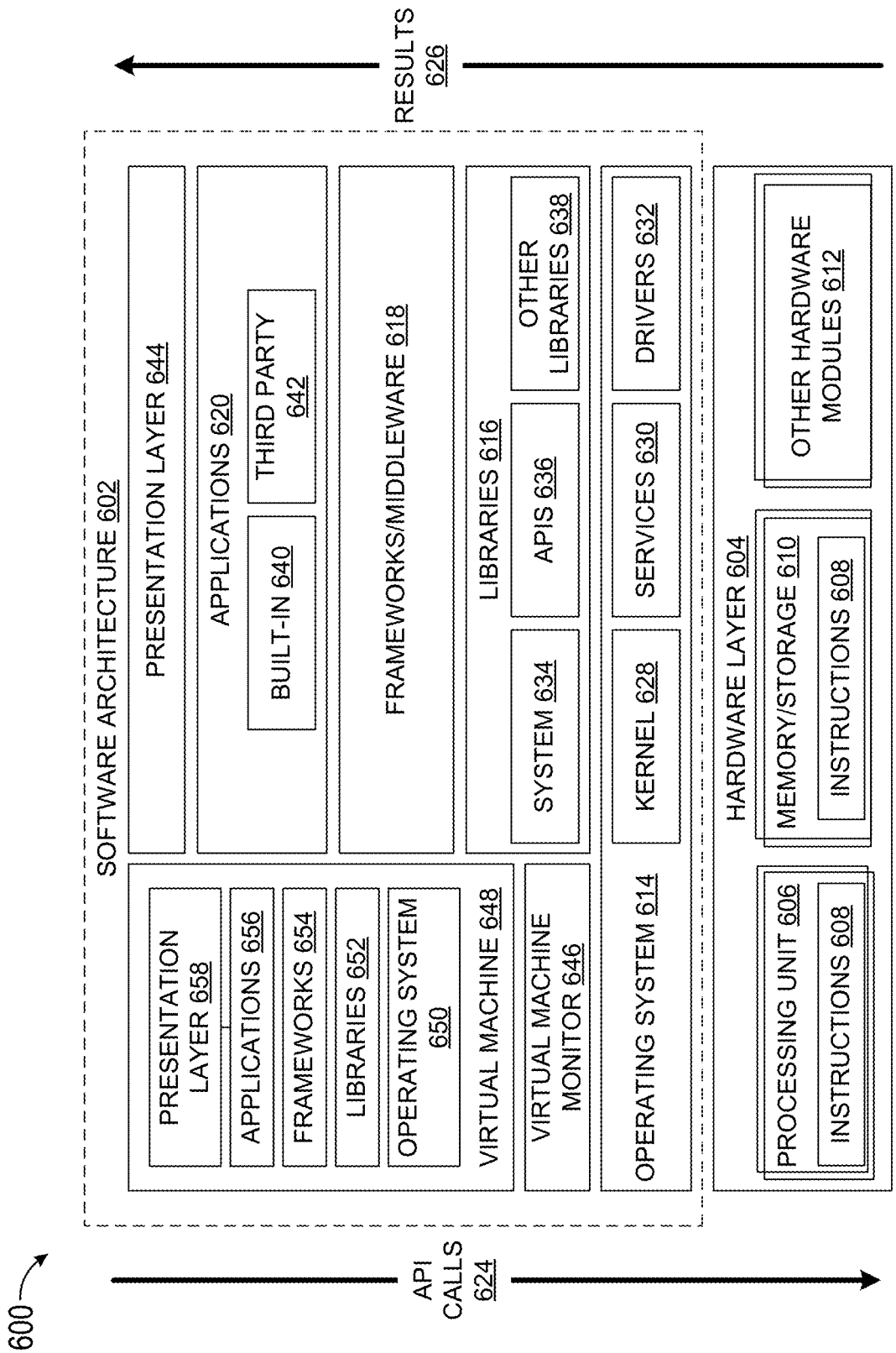
FIG. 6 is a block diagram illustrating an example of software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
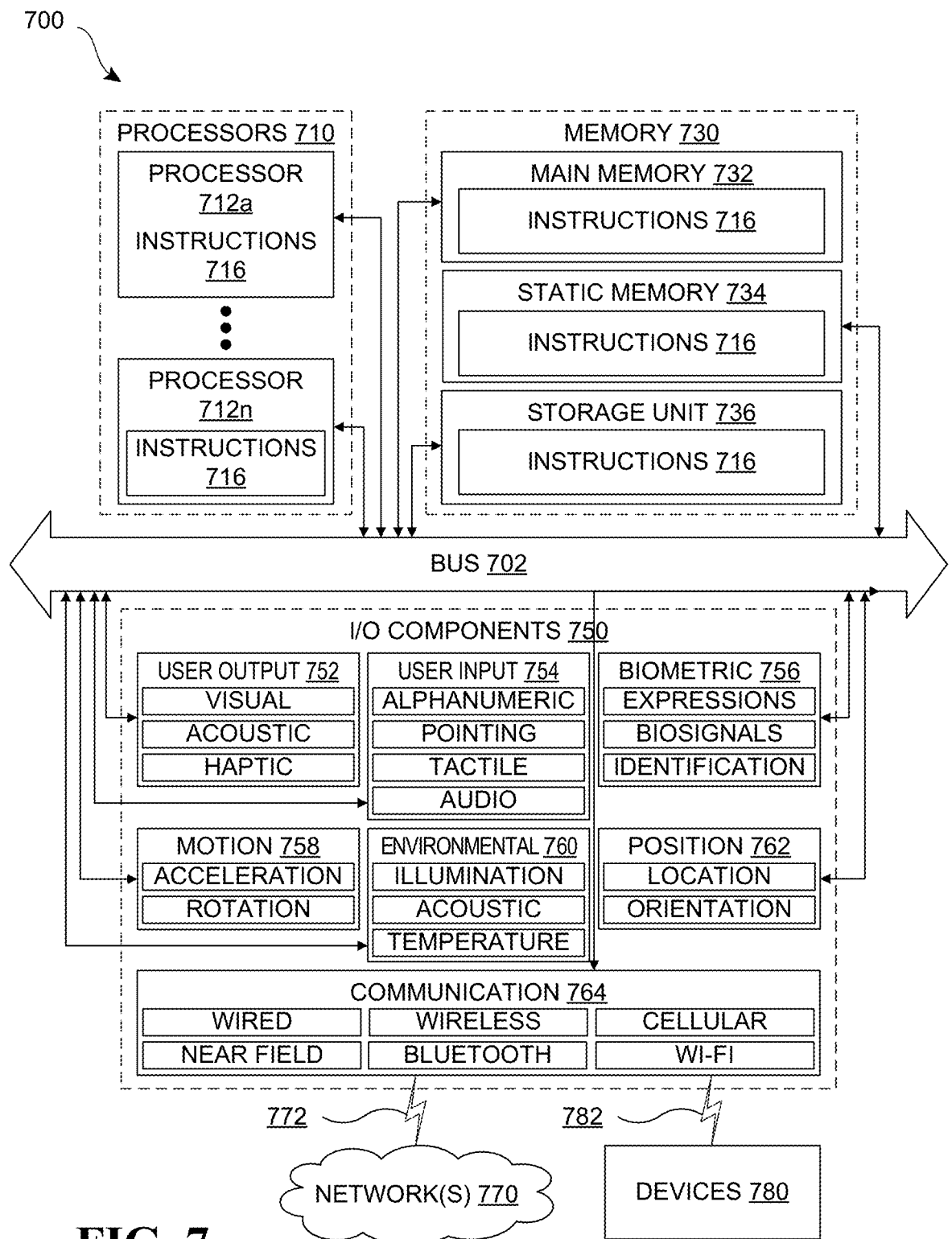
FIG. 7 is a block diagram illustrating components of an example of a machine configured to read instructions from a machine-readable medium and perform any of the features described herein.

FIG. 7 is a block diagram showing components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 816.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
    a processor; and
    a memory in communication with the processor, the memory comprising executable instructions that, when executed by the processor, cause the data processing system to perform functions of:
        receiving a request to open a document via an existing software program;
        retrieving a list of one or more supplemental software programs for the document, the list of one or more supplemental software programs including an identification for each of the one or more supplemental software programs and an application source from which each of the one or more supplemental software programs can be retrieved;
        embedding the list of one or more supplemental software programs into a data structure for the document; and
        embedding a program for processing the list of one or more supplemental software programs into a data structure for the document,
        wherein:
            the program is configured to retrieve the one or more supplemental software programs from the application source, and automatically integrate the one or more supplemental software programs into the data structure for the document.

Item 2. The data processing system of item 1, wherein the request to open a document via the existing software program is received from a third-party service provider.

Item 3. The data processing system of item 2, wherein the third-party service provider utilizes a Web Application Open Platform Interface Protocol (WOPI) and the WOPI enables acquisition of the one or more supplemental software programs.

Item 4. The data processing system of any preceding item, wherein the memory further stores executable instructions that, when executed by, the processor, cause the data processing system to transmit the data structure to a user agent for processing.

Item 5. The data processing system of any preceding item, wherein at least one of the one or more supplemental software programs functions as a service extension.

Item 6. The data processing system of any preceding item, wherein at least one of the one or more supplemental software programs functions as a core service.

Item 7. The data processing system of any preceding item, wherein the memory further stores executable instructions that, when executed by the processor, cause the data processing system to perform a function of enabling display of a user interface element for receiving consent from a user of the document for activating the one or more supplemental software programs.

Item 8. A method for automatically retrieving and integrating one or more supplemental software programs into at least one of an existing software program, comprising:
    receiving a request to open a document via the existing software program;
    retrieving a list of one or more supplemental software programs for the document, the list of one or more supplemental software programs including an identification for each of the one or more supplemental software programs and an application source from which each of the one or more supplemental software programs can be retrieved;
    embedding the list of one or more supplemental software programs into a data structure for the document; and
    embedding a program for processing the list of one or more supplemental software programs into a data structure for the document,
    wherein:
        the program is configured to retrieve the one or more supplemental software programs from the application source, and automatically integrate the one or more supplemental software programs into the data structure for the document.

Item 9. The method of item 8, wherein the request is received from a third-party service provider.

Item 10. The method of item 9, wherein the third-party service provider utilizes a Web Application Open Platform Interface Protocol (WOPI) and the WOPI enables acquisition of the one or more supplemental software programs.

Item 11. The method of any of items 8-10, further comprising transmitting the data structure to a user agent for processing.

Item 12. The method of any of items 8-11, wherein at least one of the one or more supplemental software programs functions as a service extension.

Item 13. The method of any of items 8-12, wherein at least one of the one or more supplemental software programs functions as a core service.

Item 14. The method of any of items 8-13, further comprising enabling display of a user interface element for receiving consent from a user of the document for activating the one or more supplemental software programs.

Item 15. A non-transitory computer readable medium on which are stored instructions that, when executed, cause a programmable device to:
receive a request to open a document via an existing software program;
retrieve a list of one or more supplemental software programs for the document, the list of one or more supplemental software programs including an identification for each of the one or more supplemental software programs and an application source from which each of the one or more supplemental software programs can be retrieved;
embed the list of one or more supplemental software programs into a data structure for the document; and
embed a program for processing the list of one or more supplemental software programs into a data structure for the document;
wherein:
the program is configured to retrieve the one or more supplemental software programs from the application source, and automatically integrate the one or more supplemental software programs into the data structure for the document.

Item 16. The non-transitory computer readable medium of item 15, wherein the request is received from a third-party service provider.

17. The non-transitory computer readable medium of item 16, wherein the third-party service provider utilizes a Web Application Open Platform Interface Protocol (WOPI).

18. The non-transitory computer readable medium of any of items 15-17, wherein at least one of the one or more supplemental software programs functions as a service extension.

19. The non-transitory computer readable medium of any of items 15-17, wherein at least one of the one or more supplemental software programs functions as a core service.

20. The non-transitory computer readable medium of any of items 15-17, wherein the instructions when executed, further cause the programmable device to enable display of a user interface element for receiving consent from a user of the document for activating the one or more supplemental software programs.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An online application server comprising:
a processor; and
a memory in communication with the processor, the memory comprising executable instructions that, when executed by the processor, cause the online application server to perform functions of:
receiving a request to open a document via an existing software program;

retrieving a list of one or more supplemental software programs for the document, the list of one or more supplemental software programs including an identification for each of the one or more supplemental software programs and an application source from which each of the one or more supplemental software programs can be retrieved;

constructing a data structure representing the document;

embedding the list of one or more supplemental software programs into the data structure for the document; and embedding a program for processing the list of one or more supplemental software programs into the data structure for the document, before transmitting the data structure to a user agent for processing, wherein:

the program is configured to retrieve the one or more supplemental software programs from the application source, and automatically integrate the one or more supplemental software programs into the data structure for the document.

2. The online application server of claim 1, wherein the request to open a document via the existing software program is received from a third-party service provider.

3. The online application server of claim 2, wherein the third-party service provider utilizes a Web Application Open Platform Interface Protocol (WOPI) and the WOPI enables acquisition of the one or more supplemental software programs.

4. The online application server of claim 1, wherein at least one of the one or more supplemental software programs functions as a service extension.

5. The online application server of claim 1, wherein at least one of the one or more supplemental software programs functions as a core service.

6. The online application server of claim 1, wherein the memory further stores executable instructions that, when executed by the processor, cause the online application server to perform a function of enabling display of a user interface element for receiving consent from a user of the document for activating the one or more supplemental software programs.

7. A method for automatically retrieving and integrating one or more supplemental software programs into at least one of an existing software program, comprising:

receiving a request, at an online application server, to open a document via the existing software program;

retrieving a list of one or more supplemental software programs for the document, the list of one or more supplemental software programs including an identification for each of the one or more supplemental software programs and an application source from which each of the one or more supplemental software programs can be retrieved;

constructing a data structure representing the document;

embedding the list of one or more supplemental software programs into the data structure for the document;

embedding a program for processing the list of one or more supplemental software programs into a data structure for the document; and transmitting the data structure, from the online application server, to a user agent for processing, wherein:

the program is configured to retrieve the one or more supplemental software programs from the application source, and automatically integrate the one or more supplemental software programs into the data structure for the document.

8. The method of claim 7, wherein the request is received from a third-party service provider.

9. The method of claim 8, wherein the third-party service provider utilizes a Web Application Open Platform Interface Protocol (WOPI) and the WOPI enables acquisition of the one or more supplemental software programs.

10. The method of claim 7, wherein at least one of the one or more supplemental software programs functions as a service extension.

11. The method of claim 7, wherein at least one of the one or more supplemental software programs functions as a core service.

12. The method of claim 7, further comprising enabling display of a user interface element for receiving consent from a user of the document for activating the one or more supplemental software programs.

13. A non-transitory computer readable medium on which are stored instructions that, when executed, cause a programmable device to:

receive a request to open a document via an existing software program;

retrieve a list of one or more supplemental software programs for the document, the list of one or more supplemental software programs including an identification for each of the one or more supplemental software programs and an application source from which each of the one or more supplemental software programs can be retrieved;

construct a data structure representing the document;

embed the list of one or more supplemental software programs into a data structure for the document; and embed a program for processing the list of one or more supplemental software programs into a data structure for the document, before transmitting the data structure to a user agent for processing;

wherein:

the program is configured to retrieve the one or more supplemental software programs from the application source, and automatically integrate the one or more supplemental software programs into the data structure for the document.

14. The non-transitory computer readable medium of claim 13, wherein the request is received from a third-party service provider.

15. The non-transitory computer readable medium of claim 14, wherein the third-party service provider utilizes a Web Application Open Platform Interface Protocol (WOPI).

16. The non-transitory computer readable medium of claim 13, wherein at least one of the one or more supplemental software programs functions as a service extension.

17. The non-transitory computer readable medium of claim 13, wherein at least one of the one or more supplemental software programs functions as a core service.

18. The non-transitory computer readable medium of claim 13, wherein the instructions when executed, further cause the programmable device to enable display of a user interface element for receiving consent from a user of the document for activating the one or more supplemental software programs.

* * * * *